United States Patent
Mian

(10) Patent No.: US 12,258,057 B2
(45) Date of Patent: Mar. 25, 2025

(54) IMAGE-BASED VEHICLE EVALUATION FOR NON-COMPLIANT ELEMENTS

(71) Applicant: International Electronic Machines Corp., Troy, NY (US)

(72) Inventor: Zahid F. Mian, Loudonville, NY (US)

(73) Assignee: International Electronic Machines Corp., Troy, NY (US)

( * ) Notice: Subject to any disclaimer, the term of this patent is extended or adjusted under 35 U.S.C. 154(b) by 0 days.

(21) Appl. No.: 17/849,340

(22) Filed: Jun. 24, 2022

(65) Prior Publication Data

US 2022/0410951 A1 Dec. 29, 2022

Related U.S. Application Data

(60) Provisional application No. 63/215,086, filed on Jun. 25, 2021.

(51) Int. Cl.
*B61L 27/40* (2022.01)
*B61L 27/53* (2022.01)
*G01S 17/931* (2020.01)
*G06T 7/70* (2017.01)
*G06V 10/764* (2022.01)
*G06V 20/54* (2022.01)

(52) U.S. Cl.
CPC ............ *B61L 27/40* (2022.01); *B61L 27/53* (2022.01); *G01S 17/931* (2020.01); *G06T 7/70* (2017.01); *G06V 10/764* (2022.01); *G06V 20/54* (2022.01); *G06T 2207/10012* (2013.01); *G06T 2207/30252* (2013.01)

(58) Field of Classification Search
CPC ............ B16L 27/40; B16L 27/53; G06T 7/70
See application file for complete search history.

(56) References Cited

U.S. PATENT DOCUMENTS

| | | | |
|---|---|---|---|
| 10,202,135 B2 * | 2/2019 | Mian | G06V 20/52 |
| 10,946,878 B1 * | 3/2021 | Beard | G08B 29/188 |
| 10,970,851 B2 * | 4/2021 | Mian | G06T 7/246 |
| 2006/0098843 A1 | 5/2006 | Chew | |
| 2006/0231685 A1 * | 10/2006 | Mace | B61L 1/16 |
| | | | 246/169 R |
| 2007/0064244 A1 | 3/2007 | Mian et al. | |
| 2010/0100275 A1 | 4/2010 | Mian et al. | |

(Continued)

OTHER PUBLICATIONS

International Search Report and Written Opinion, International Application No. PCT/US2022/35141, mailed Oct. 31, 2022, 10 pages.

*Primary Examiner* — Long T Tran
(74) *Attorney, Agent, or Firm* — LaBatt, LLC

(57) ABSTRACT

A solution for evaluating passing vehicles can include one or more imaging devices and a computing unit for processing image data acquired by the imaging device(s). The imaging devices can acquire image data that enables the computing unit to accurately identify a location of an element of the vehicle in an area that includes a region in which the passing vehicle is located and a restricted region in which no element or portion of an element of the passing vehicle should be unnecessarily located. The computing unit can classify any element at least partially located within the restricted region and initiate an action when such an element is not classified into a category of elements that is necessary to be located within the restricted region.

20 Claims, 7 Drawing Sheets

(56) References Cited

U.S. PATENT DOCUMENTS

| | | | |
|---|---|---|---|
| 2012/0269383 A1* | 10/2012 | Bobbitt | G06V 20/54 |
| | | | 382/103 |
| 2013/0083188 A1 | 4/2013 | Mian et al. | |
| 2014/0333771 A1 | 11/2014 | Mian et al. | |
| 2014/0339374 A1* | 11/2014 | Mian | B61L 29/30 |
| | | | 246/473.1 |
| 2014/0371911 A1 | 12/2014 | Mian et al. | |
| 2015/0110350 A1 | 4/2015 | Mian et al. | |
| 2017/0227470 A1 | 8/2017 | Cesarano | |
| 2018/0194379 A1* | 7/2018 | McGavock, Jr. | B61L 29/30 |
| 2018/0339720 A1 | 11/2018 | Singh | |
| 2019/0039633 A1* | 2/2019 | Li | B61L 23/047 |
| 2019/0265703 A1* | 8/2019 | Hicok | G05D 1/617 |
| 2020/0231193 A1* | 7/2020 | Chen | G01N 21/8851 |
| 2020/0408682 A1 | 12/2020 | Mian et al. | |
| 2021/0058588 A1 | 2/2021 | Abreo | |
| 2021/0127044 A1* | 4/2021 | Shimizu | H04N 23/52 |
| 2022/0172335 A1 | 6/2022 | Mian et al. | |

\* cited by examiner

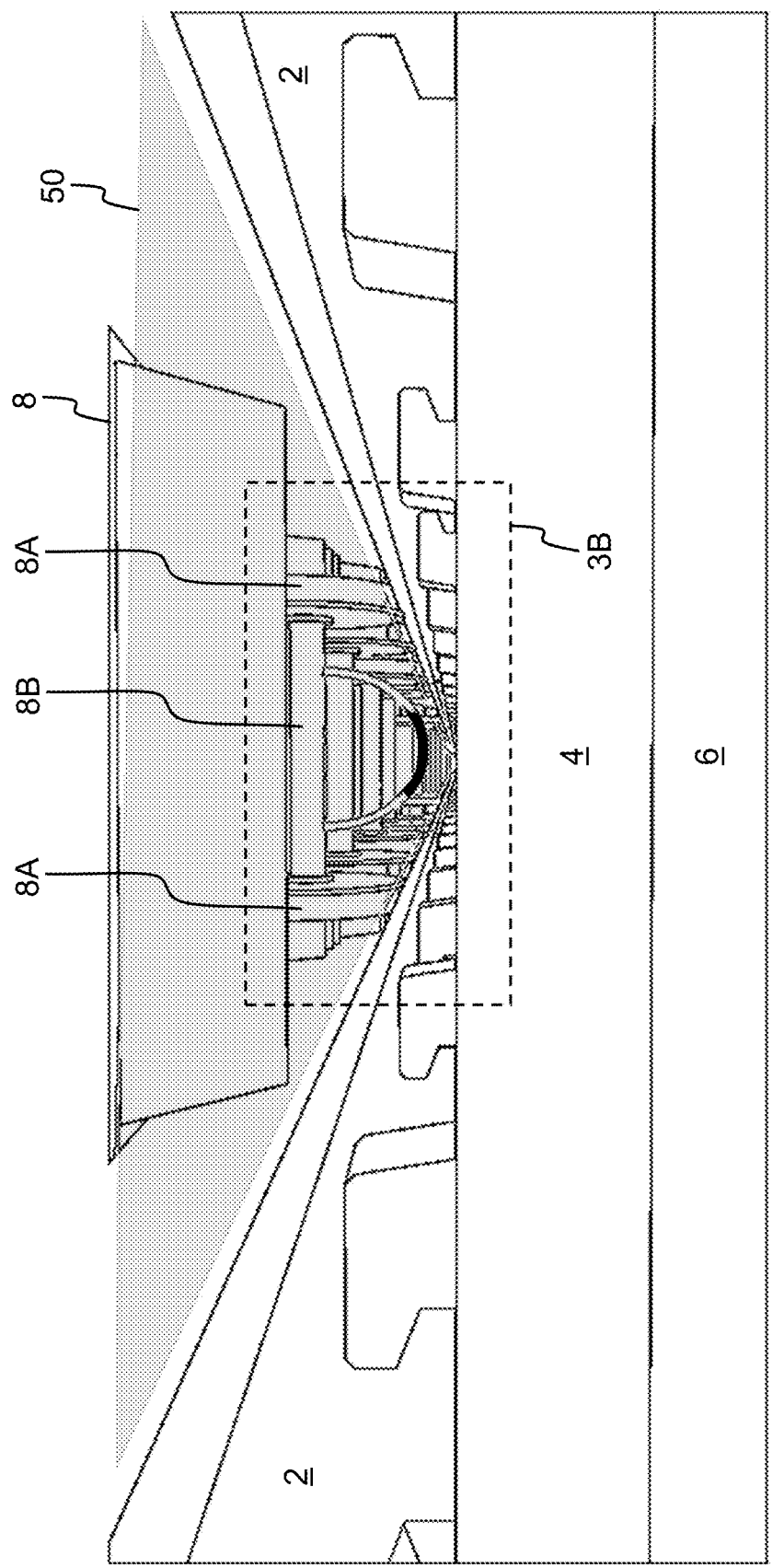

IMAGE-BASED VEHICLE EVALUATION FOR NON-COMPLIANT ELEMENTS

REFERENCE TO RELATED APPLICATIONS

The current application claims the benefit of U.S. Provisional Application No. 63/215,086, which was filed on 25 Jun. 2021, and which is hereby incorporated by reference.

TECHNICAL FIELD

The disclosure relates generally to monitoring vehicles, and more particularly, to a solution for evaluating passing vehicles for elements that may present an unsafe condition.

BACKGROUND ART

Rail vehicles are complex pieces of equipment which, in addition to the basic body and wheel assemblies (bogies), include other key elements including couplers, brakes and brake hoses, wiring, and other components. On occasion, these elements may break or become unfastened, thus sagging very low or dragging on the ground. In addition, flatcars may carry multiple cargoes that are fastened down by straps or other tie-down methods, and which may come partially loose, dragging on the ground or traversing considerable arcs as a train rounds a curve.

The presence of dragging or hanging elements presents an extremely dangerous situation. Train main-line speeds are usually in the range of sixty miles per hour (one hundred kilometers per hour), and can be considerably faster in some areas. A move towards high-speed rail makes main-line speeds that reach or exceed a hundred and fifty miles per hour (two hundred forty kilometers per hour) quite possible. At such speeds, a dragging brake hose, or loose-flying cargo strap, is a powerful weapon capable of breaking other adjacent equipment or killing any person struck.

Most railroads install dragging equipment detectors (DEDs) to generate alerts that enable the railroad to deal with such hazards. In general design, a DED can be any of various objects, generally with a rounded triangle in cross-section, which is located between the rails. When struck by dragging equipment, the DED sends an alert signal in some fashion. The detection method may involve sensing the amount of rotation imparted to the object, measuring the strain on the object's base, or other similar solutions.

SUMMARY OF THE INVENTION

While reasonably effective, the inventor has recognized that current DEDs present multiple drawbacks. For example, when struck by a piece of equipment of significant size, the DED can be damaged or destroyed, and even those DEDs which are not can quickly accumulate sufficient wear and tear to require considerable service or even complete replacement.

The inventor further recognizes that current DED design presents an additional problem by requiring structure which, by its nature, must project up to a maximum height of allowable drag. In particular, the presence of such projecting structure reduces the chance of any low-hanging equipment surviving a "detection" collision. In fact, collision with a DED may actually tear a loose but still fastened brake hose free, worsening the situation the DED is meant to detect. Moreover, as intrusive impact-based detectors, current DEDs cannot detect objects outside of the immediate area in which the projecting structure is located, including projecting cargo on a flatbed, trailing belts, and so on.

In view of at least these drawbacks as well as other limitations of the current art in vehicle evaluations, the inventor provides a non-contact vehicle evaluation solution, which can be configured to cover a wide-area, for accurately and reliably detecting non-compliant elements of a vehicle, such as elements that are located beyond a safe area. The solution can provide timely alerts to the presence of such non-compliant elements. Embodiments of the invention can make use of imaging-based modalities and image analysis to detect, identify, and alert on the presence of non-compliant elements of a vehicle, such as loose or dragging equipment, modified elements, missing or damaged elements, added elements, etc.

In an illustrative application, embodiments of the invention can address significant issues in the reliable detection of dragging or otherwise loose equipment, such as brake hoses, cargo ties, etc., on a moving vehicle, such as a rail vehicle. Such loose equipment can damage or destroy other equipment on, between, or near the rails, and injure or kill living creatures in the vicinity.

In an illustrative embodiment, one or more structures incorporating an imaging device are placed near or between the tracks of a railroad, in such a position that they can view the undercarriage or other key areas of approaching rail vehicles. The images produced are analyzed to detect any elements of the approaching rail vehicles that are entering/passing through areas or volumes of space which should not be violated, for instance, the area below top-of-rail. If such elements are detected, their location and the particular associated rail vehicle data is sent in an alert form to a designated receiver of such alerts.

Aspects of the invention provide a solution for evaluating passing vehicles, which can include one or more imaging devices and a computing unit for processing image data acquired by the imaging device(s). The imaging devices can acquire image data that enables the computing unit to accurately identify a location of an element of the vehicle in an area that includes a region in which the passing vehicle is located and a restricted region in which no element or portion of an element of the passing vehicle should be unnecessarily located. The computing unit can classify any element at least partially located within the restricted region and initiate an action when such an element is not classified into a category of elements that is necessary to be located within the restricted region.

A first aspect of the invention provides a vehicle evaluation system comprising: a set of imaging devices configured to acquire image data relating to a passing vehicle, wherein the image data includes image data for an area including an authorized region in which the passing vehicle is present and a restricted region within which no element or portion of an element of the passing vehicle should be unnecessarily located; and a computing unit for processing the image data to detect any element of the passing vehicle unnecessarily located within the restricted region, wherein the processing includes: processing the image data to identify whether any elements of the passing vehicle are at least partially located within the restricted region; classifying each element at least partially located within the restricted region into one of a plurality of categories of elements; and initiating an action in response to at least one element at least partially located within the restricted region not being classified into a category of elements that is necessary to be located within the restricted region.

A second aspect of the invention provides a method of evaluating a vehicle, the method comprising: acquiring image data relating to a passing vehicle using a set of imaging devices, wherein the image data includes image data for an area including an authorized region in which the passing vehicle is present and a restricted region within which no element or portion of an element of the passing vehicle should be unnecessarily located; a computing unit processing the image data to detect any element of the passing vehicle unnecessarily located within the restricted region, wherein the processing includes: the computing unit processing the image data to identify whether any elements of the passing vehicle are at least partially located within the restricted region; the computing unit classifying each element at least partially located within the restricted region into one of a plurality of categories of elements; and the computing unit initiating an action in response to at least one element at least partially located within the restricted region not being classified into a category of elements that is necessary to be located within the restricted region.

A third aspect of the invention provides a rail vehicle evaluation system comprising: a set of imaging devices configured to acquire image data relating to a passing rail vehicle, wherein the image data includes image data for an area of an underside of the passing rail vehicle, the area including an authorized region in which the passing rail vehicle is present and a restricted region within which no element or portion of an element of the passing rail vehicle should be unnecessarily located; and a computing unit for processing the image data to detect any element of the passing rail vehicle unnecessarily located within the restricted region, wherein the processing includes: processing the image data to identify whether any elements of the passing rail vehicle are at least partially located within the restricted region; classifying each element at least partially located within the restricted region into one of a plurality of categories of elements, wherein the plurality of categories of elements include wheels; and initiating an action in response to at least one element at least partially located within the restricted region not being classified as a wheel.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIGS. 3A and 3B show an illustrative imaging configuration for acquiring image data of a passing rail vehicle according to an embodiment.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for evaluating passing vehicles, which can include one or more imaging devices and a computing unit for processing image data acquired by the imaging device(s). The imaging devices can acquire image data that enables the computing unit to accurately identify a location of an element of the vehicle in an area that includes a region in which the passing vehicle is located and a restricted region in which no element or portion of an element of the passing vehicle should be unnecessarily located. The computing unit can classify any element at least partially located within the restricted region and initiate an action when such an element is not classified into a category of elements that is necessary to be located within the restricted region.

Figure 1:
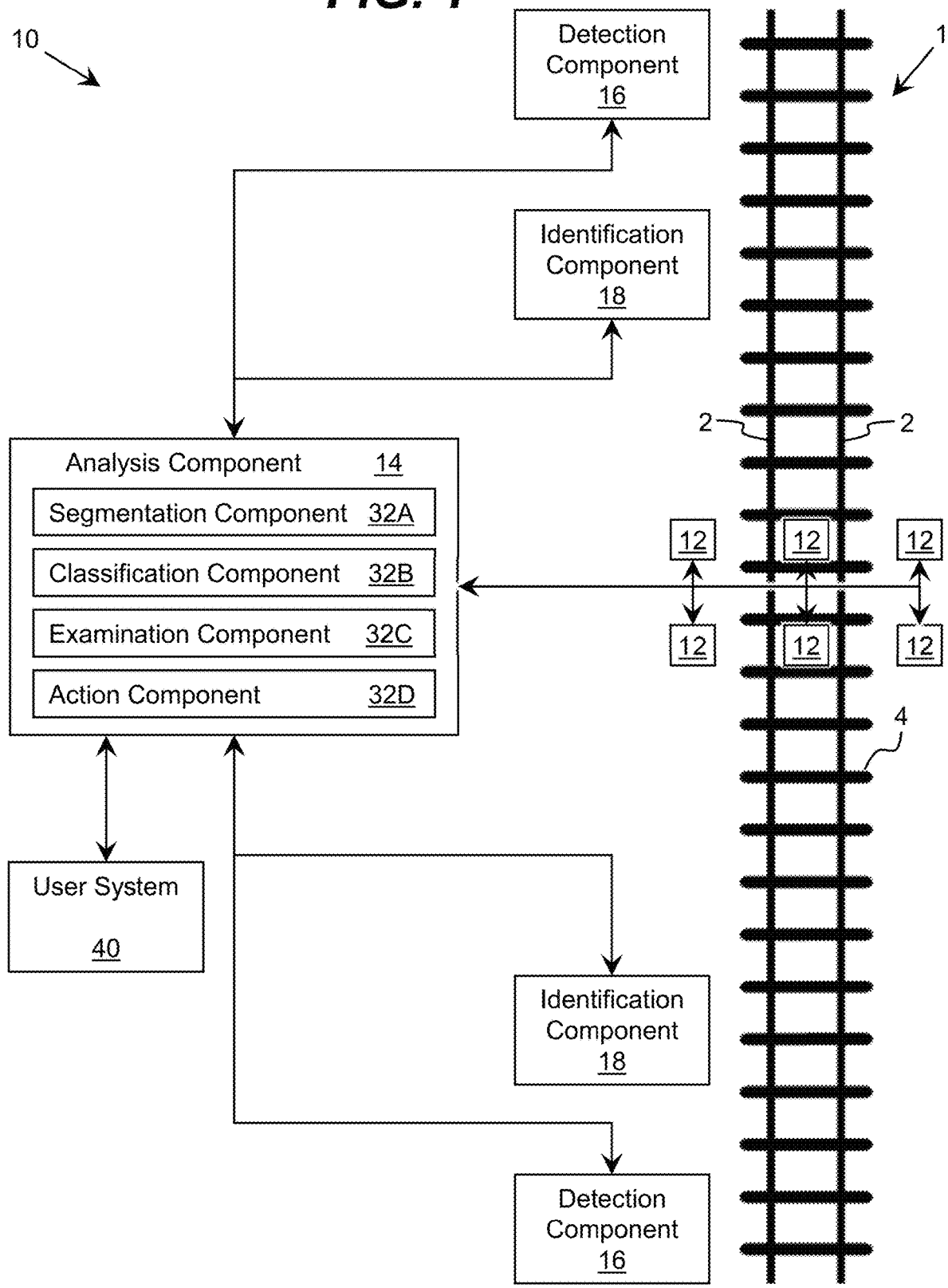
FIG. 1 shows an illustrative vehicle evaluation system for evaluating vehicles as they travel along a path according to embodiments.
Figure 2:
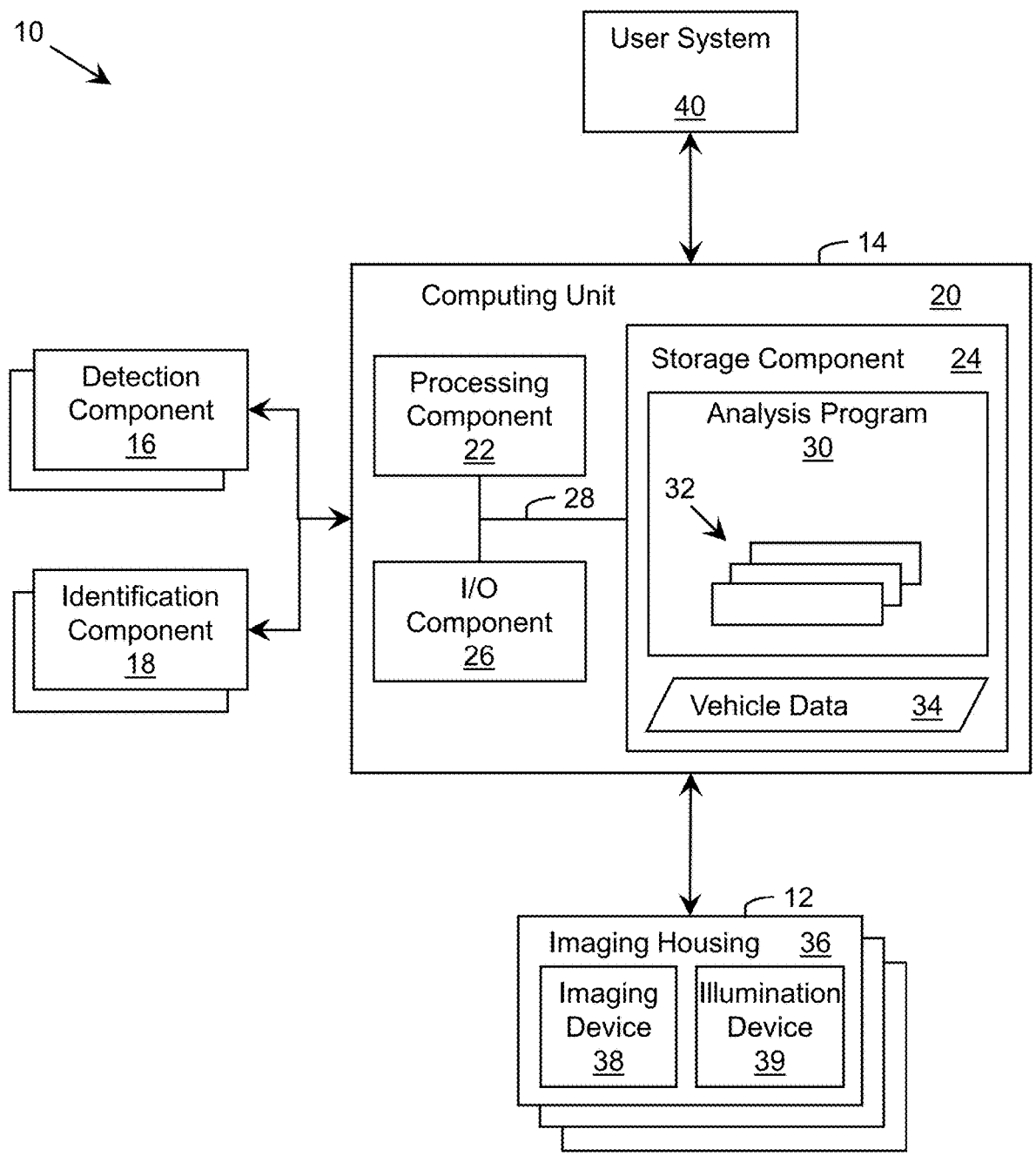
FIG. 2 shows another illustrative vehicle evaluation system for evaluating vehicles as they travel along a path according to embodiments.

Turning to the drawings, FIGS. 1 and 2 show an illustrative vehicle evaluation system 10 for evaluating vehicles as they travel along a path 1 according to embodiments. As illustrated in FIG. 1, the vehicle evaluation system 10 can be deployed in an environment in which the path 1 corresponds to a railroad, which includes tracks 2 supported by ties 4, and the vehicles are rail vehicles. The rail vehicles can travel along the railroad as a single vehicle, as part of a plurality of connected vehicles (e.g., a consist), and/or as part of a train.

However, it is understood that this is only illustrative of various possible deployment locations and paths 1. For example, in an alternative embodiment, the path 1 can comprise a road or other surface (e.g., an exit/entrance ramp, an inspection area, an entrance, airport runway, speedway, etc.) configured for travel by any of various wheeled vehicles (e.g., trucks, automobiles, planes, etc.). More particularly, the path 1 can correspond to a roadway or inspection site and the vehicle evaluation system 10 can evaluate vehicles, such as commercial vehicles (trucks), as they are traveling along the path 1. Trailing or dragging elements can be as significant a threat when associated with vehicles, such as commercial vehicles, as they are when associated with trains. This is particularly so since the commercial vehicles share road space with multiple other vehicles, creating a higher potential for serious injury in the case of issues such as loose or trailing cargo straps.

The vehicle evaluation system 10 can be configured to acquire image data of vehicles traveling along the path 1. To this extent, the vehicle evaluation system 10 can include one or more imaging components 12, each of which is configured to acquire image data as a vehicle travels along the path 1. As illustrated, the vehicle evaluation system 10 can include at least one imaging component 12 configured to acquire image data from a location over which the vehicle passes (e.g., from between the tracks 2). Additionally, the vehicle evaluation system 10 can include an imaging component 12 configured to acquire image data from a side of the path 1 of the vehicle. As used herein, the image data can comprise a single image including three-dimensional data for the imaged area or multiple images (e.g., acquired by multiple cameras or as a series of images by a single camera, such as a video) which can be processed to generate three-dimensional data for the imaged area.

In an embodiment, a location at which the imaging components 12 are installed can be selected and/or configured to provide desired information. For example, the location can be selected in a location of a path 1 where the vehicles are traveling more slowly, which can increase image quality and can increase a likelihood of detecting certain hanging elements, which will not be elevated due to wind caused by the traveling vehicle. Furthermore, the path 1 may include a curve at the evaluation region, which can enable detection of any elements, such as a broken cargo strap, that may swing out from the vehicle as it navigates the curve. Regardless, it is understood that the path 1 also can correspond to a region at which vehicles are moving at their maximum speed.

In the embodiment shown in FIG. 1, the vehicle evaluation system 10 is shown including two sets of three imaging components 12. Each set of imaging components 12 can be configured to acquire image data for a vehicle traveling in a different direction along the path 1. However, it is understood that this is only illustrative and a single set of imaging components 12 can be deployed to only acquire image data of vehicles traveling in one direction along the path 1. e.g., when only one direction of travel is permitted or is desired for evaluation. Additionally, an imaging component 12 can include imaging devices that can be rotated to acquire image data of vehicles traveling on either direction of the path 1. Furthermore, each set of imaging components 12 can include any number of one or more imaging components 12, which can be positioned in any appropriate location with respect to the path 1 to acquire image data suitable for the analysis described herein. For example, embodiments of a set of imaging components 12 can include only one imaging component 12, such as an imaging component 12 positioned to have the vehicle pass thereover.

As schematically illustrated in FIG. 2, an embodiment of an imaging component 12 can include an imaging housing 36, which houses one or more imaging devices, such as imaging device 38, therein. Additionally, the imaging housing 36 can house one or more illumination devices, such as the illumination device 39, which can be operated in conjunction with the imaging device 38. Each device 38, 39 can be secured to the housing 36 using any suitable mounting solution. The housing 36 and mounting can be configured to shelter the devices 38, 39, isolate the devices 38, 39 from vibration due to passing vehicles, protect the devices 38, 39 from the environment, prevent damage to the devices 38, 39 due to flying debris and/or passing objects, etc.

In an embodiment, the housing 36 can be installed such that the devices 38, 39 are not located in the space above the travel surface. For example, the housing 36 can be installed level with or below a surface of the path 1. When the path 1 includes tracks 2, the housing 36 can be installed even lower, such as no higher than the surface supporting the tracks 2, e.g., approximately level with or below the height of the ties 4 and/or the ballast within which the ties 4 are located. Similarly, when the path is a road, the housing 36 can be located level with or below the surface of the road. However, it is understood that this configuration is only illustrative. To this extent, embodiments can include some portion of the housing 36 and/or one or more of the corresponding devices 38, 39 protruding above the travel surface or above the ties 4 and/or ballast (but below the tracks 2. In this case, the extent of protrusion should be selected such that there is no risk of collision from properly located elements of the corresponding vehicles as well as minimal risk of damage and/or snagging due to a collision with dragging equipment.

An imaging device 38 can comprise any suitable type of imaging device. Illustrative embodiments of an imaging device 38 include, but are not limited to, a charge-coupled device (CCD) or complementary metal oxide semiconductor (CMOS) camera in the visible-light range, an infrared camera, a three-dimensional imaging device (e.g., a light detection and ranging (LiDAR) imaging device, such as a flash LiDAR imaging device), a three-dimensional laser scanner, etc. Similarly, an illumination device 39 can comprise any suitable type of illumination device. Illustrative illumination devices 39 can emit diffuse, structured, laser, and/or the like, light, which has a spectra that corresponds the imaging spectra for the corresponding imaging device 38. In short, any technology that enables the recording or generation of image data of any sort (e.g., two or three dimensional images, point clouds, etc.) that is suitable for analysis to reliably detect elements of a minimum target size and determine a location of such elements in three-dimensional space to a desired accuracy can be utilized.

Each imaging component 12 can be configured to acquire image data from which sufficiently accurate range and dimension information on elements located within at least a portion of the field of view of the imaging component 12. In an illustrative embodiment, an imaging component 12 includes a pair of imaging devices 38 which are operated to provide stereo image data of a desired area. However, it is understood that any number of one or more imaging devices can be used. For example, when a single imaging device is capable of generating three-dimensional data, such as a LIDAR camera, only a single imaging device can be used. Additionally, more than two imaging devices can be included to provide redundancy, provide image data capable of analyzing multiple planes, provide image data using different imaging solutions, such as based on sensed electromagnetic radiation from different areas of the electromagnetic spectrum (e.g., visible, near infrared, infrared, ultraviolet, etc.), sensed mechanical waves (e.g., sound waves, such as ultrasound), and/or the like.

Each imaging component 12 is shown in communication with an analysis component 14. The analysis component 14 can include any configuration of computing hardware that is capable of performing the analysis described herein. The analysis component 14 can include computing hardware that is co-located with the imaging component(s) 12 (e.g., located in the same housing) and/or can include computing hardware that is located near the path 1, e.g., in a protected bungalow.

Communications between the analysis component 14 and each imaging component 12 can be implemented, for example, by a wired connection buried in a conduit between the components 12, 14.

The analysis component 14 can receive image data from one or more of the imaging components 12 and evaluate one or more attributes of the vehicle based on the image data. To this extent, the analysis component 14 can include a segmentation component 32A, which can segment image data into individual objects (e.g., blobs) at various locations on the vehicle. Furthermore, a classification component 32B can classify objects in the image data which are relevant to the vehicle evaluation, e.g., according to which element of the vehicle the object corresponds. An examination component 32C can examine the classified objects to evaluate the vehicle.

Additionally, the analysis component 14 can include an action component 32D which can manage the operation of one or more components of the vehicle evaluation system 10. For example, as discussed herein, the action component 32D can manage operation of the detection component 16, identification component 18, and imaging component(s) 12, e.g., based on the presence or absence of vehicles traveling along the path 1. Furthermore, the action component 32D can manage the identifying data of the vehicles and their associated image data and evaluation result.

The action component 32D also can interface with one or more external systems, such as a user system 40. The user system 40 can comprise any type of system that uses the evaluation data generated by the vehicle evaluation system 10. To this extent, the user system 40 can be utilized by a vehicle safety inspector, a vehicle fleet manager, a track owner, a vehicle maintenance facility, and/or the like. Furthermore, the user system 40 can be utilized by an operator of a vehicle or train being evaluated. To this extent, the action component 32D can initiate one or more actions in response to the evaluation indicating a violation (e.g., an unsafe condition). For example, the action component 32D can provide an indication of the violation to one or more user systems 40, which can result in action such as maintenance being scheduled, the vehicle operation being slowed or removed from service for maintenance, a violation being issued, and/or the like.

As noted, the vehicle evaluation system 10 is shown including various other components that can enhance one or more aspects of the operation of the system. For example, when the environment in which the vehicle evaluation system 10 is deployed includes only infrequent passage of vehicles and is not readily manually activated and inactivated, the vehicle evaluation system 10 can include a detection component 16, which is configured to detect an approaching vehicle. The detection component 16 can comprise any suitable device or combination of devices for detecting an approaching vehicle. For example, the detection component 16 can comprise one or more sets of wheel detection switches (e.g., such as those manufactured by Frauscher), a separate imaging or laser detection system, an enhanced automated equipment identification (AEI) tag system, and/or the like.

In an embodiment, the detection component 16 acquires data and/or generates a signal which is sent to the analysis component 14 (e.g., the action component 32D) for processing. In response to the data/signal indicating a vehicle traveling along the path 1, the analysis component 14 can initialize the corresponding imaging components 12 for image data acquisition. Similarly, the analysis component 14 also can use data from the detection component 16 indicating a lack of any vehicles to change an operating mode of the imaging components 12, e.g., to a sleep or low power mode. In another embodiment, the detection component 16 is implemented by the analysis component 14 analyzing the image data acquired by one or more of the imaging components 12. In this case, the analysis component 14 can adjust a frame rate at which the image data is acquired by the imaging components. For example, when no vehicle is present on the path 1, the image data can be acquired at a relatively low frame rate as compared to a frame rate used when a vehicle is present on the path 1. It is understood that the respective frame rates can be selected based on a maximum speed of the vehicles on the path 1.

The vehicle evaluation system 10 also is shown including an identification component 18, which can acquire identifying data for each vehicle that is analyzed as it travels along the path 1. The identification data can be acquired, for example, by an AEI tag reader, an optical reading of a vehicle number by a wayside camera, an optical reading of a license plate by a wayside camera, and/or the like. In an embodiment, when visible from the front of the vehicle, the identifying data for a vehicle can be acquired by one or more of the imaging components 12. In an embodiment, the vehicle evaluation system 10 can use an internal scheme (along with or as an alternative to globally unique identifying data) to identify a vehicle. For example, the analysis component 14 can identify the vehicle by a time stamp it traveled through the path 1, by a location of the vehicle in a connected set of vehicles (e.g., rolling stock or a train), and/or the like.

FIG. 2 shows a more particular illustrative embodiment of the analysis component 14. In this case, the analysis component 14 is implemented as a computing unit 20 that can perform a process described herein in order to evaluate vehicles traveling along the path 1. In particular, the computing unit 20 is shown including an analysis program 30, which makes the computing unit 20 operable to evaluate the vehicles by performing a process described herein. To this extent, the analysis program 30 can include a plurality of modules 32, each of which can include program code, which when executed by the computing unit 20, performs the actions described in conjunction with the one or more of the components 32A-32D of the analysis component 14 shown in FIG. 1.

The computing unit 20 is shown including a processing component 22 (e.g., one or more processors), a storage component 24 (e.g., a storage hierarchy, which can include one or more types of memory, storage drives, etc.), an input/output (I/O) component 26 (e.g., one or more I/O interfaces and/or devices), and a communications pathway 28. In general, the processing component 22 executes program code, such as the analysis program 30, which is at least partially fixed in storage component 24. While executing program code, the processing component 22 can process data, which can result in reading and/or writing transformed data from/to the storage component 24 and/or the I/O component 26 for further processing. The pathway 28 provides a communications link between each of the components in the computing unit 20.

The I/O component 26 can comprise one or more human I/O devices, which enable a human user to interact with the computing unit 20 and/or one or more communications devices to enable a user system 40 to communicate with the computing unit 20 using any type of communications link. To this extent, the analysis program 30 can manage a set of interfaces (e.g., graphical user interface(s), application program interface, and/or the like) that enable human and/or user systems 40 to interact with the analysis program 30. Furthermore, the analysis program 30 can manage (e.g., store, retrieve, create, manipulate, organize, present, etc.) the data, such as vehicle data 34, using any solution.

In any event, the computing unit 20 can comprise one or more general purpose computing articles of manufacture (e.g., computing devices) configured to execute the analysis program 30 installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the analysis program 30 can be embodied as any combination of system software and/or application software.

Furthermore, the analysis program 30 can be implemented using a set of modules 32. In this case, a module 32 can cause the computing unit 20 to perform a set of tasks used by the analysis program 30, and can be separately developed and/or implemented apart from other portions of the analysis program 30. As used herein, the term "component" means any configuration of hardware, with or without software, which implements the functionality described in conjunction therewith using any solution, while the term "module" means program code that enables a computing unit 20 to implement the actions described in conjunction therewith using any solution. When fixed in a storage component 24 of a computing unit 20 that includes a processing component 22, a module is a substantial portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of the computing unit 20.

It is understood that the computing unit 20 and the analysis program 30 are only representative of various possible equivalent implementations of the analysis component 14 using one or more computing units. To this extent, in other embodiments, the functionality provided by the computing unit 20 and the analysis program 30 can be at least partially implemented by one or more computing units that include any combination of general and/or specific purpose hardware with or without program code. In each embodiment, the hardware and program code, if included, can be created using standard engineering and programming techniques, respectively.

Regardless, communications between two or more computing devices, such as between the computing unit 20 and the user system 40 and/or between multiple computing units implementing the analysis component 14, can use any combination of various types of communications links. A communications link can comprise any combination of various types of optical fiber, wired, and/or wireless links; comprise any combination of one or more types of networks (e.g., public and/or private); and/or utilize any combination of various types of transmission techniques and protocols.

In an illustrative embodiment described further herein, the vehicle evaluation system 10 is configured to acquire image data for an undercarriage of an approaching vehicle and evaluate the image data to detect hanging (e.g., low-hanging) or dragging elements of the vehicles or the cargo being carried thereon. As used herein an element of a vehicle comprises any of various components of the vehicle itself (e.g., wheels, axles, doors, couplers, brake lines, etc.), as well as any of various items that may be traveling with the vehicle. Such items can include cargo, straps or other items for securing cargo, branches or other items that may have collided with the vehicle and become stuck, etc.

Figure 3B:
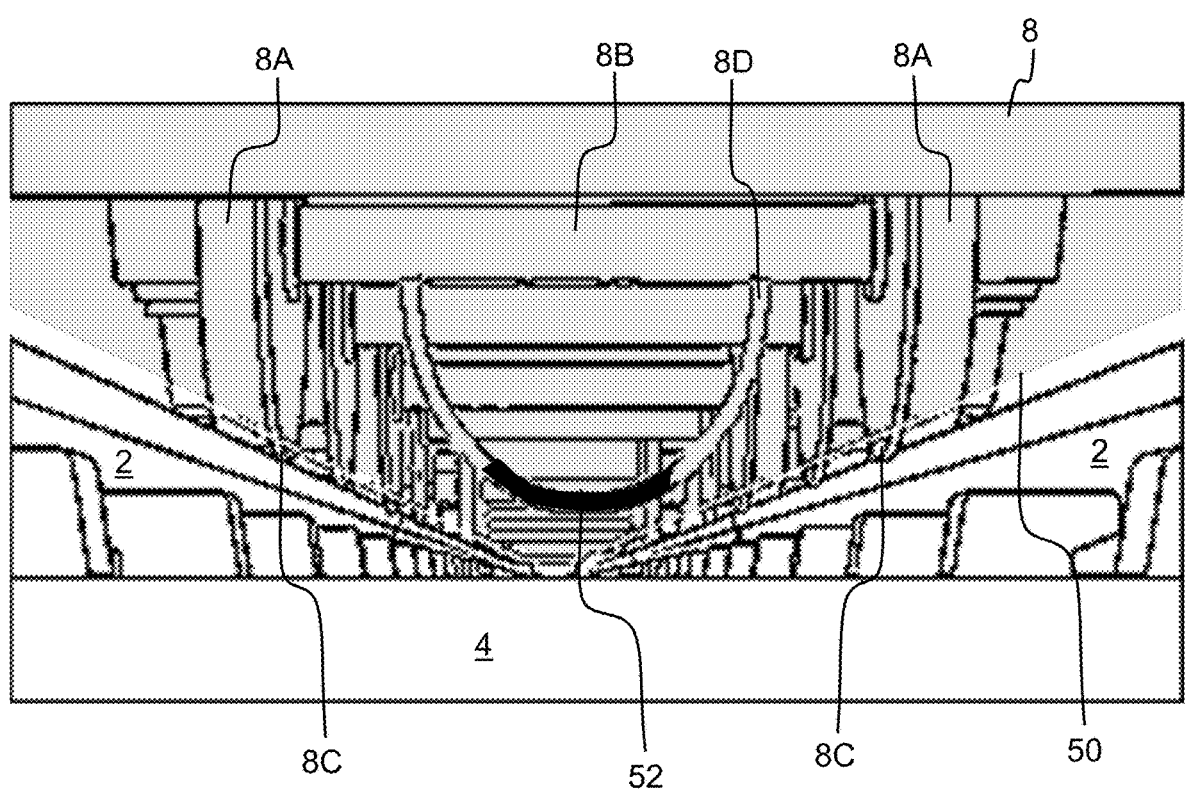

FIG. 3A shows an illustrative imaging configuration for acquiring image data of a passing rail vehicle according to an embodiment. FIG. 3B shows a zoomed in portion of the configuration, as indicated in FIG. 3A. As illustrated, tracks 2 can be supported by ties 4, which are in turn embedded in/supported by ballast 6. To this extent, an imaging component 12 (FIG. 2) can be installed such that its top is level with or below the height of the tracks 2, ties 4, and/or ballast 6 to provide protection from rail vehicles 8 traveling along the tracks 2. In general, a rail vehicle 8 is supported by wheels 8A which are connected by an axle 8B. As illustrated in FIG. 3B, the rail wheels 8A include a flange 8C, which extends below the top surface of the rail on the gauge (interior) side of the tracks 2. A brake hose 8D of the rail vehicle 8 is shown hanging below the axles 8B. In an embodiment, the vehicle evaluation system is configured to detect when such a brake hose 8D is hanging sufficiently low to create an unsafe operating condition.

In an embodiment, the analysis component 14 can define a plane 50, which creates two regions, an authorized region in which the vehicle 8 is present, and a restricted region within which no element of the vehicle 8 or a portion thereof should unnecessarily be located. In an embodiment, the plane 50 is located below the vehicle 8. In this case, only the known and necessary presence of the wheels 8A can be acceptable in the corresponding restricted region.

Due to placement of the imaging device 12 between the and below the tracks 2, image data acquired by the imaging device 12 may not be sufficient for analysis of potential dragging or hanging elements that may be located on the field side of the tracks 2. To this extent, in an embodiment, the imaging components 12 located on the left and right of the path 1 can be used to extend the plane 50 to areas to the left/right of the path 1.

The plane 50 can be located parallel to the surface of the path 1 on which the vehicle 8 is traveling, even with or some desired distance above the surface. The particular distance above the surface can vary based on the environment in which the vehicle evaluation system 10 is deployed. In an embodiment, the distance is selected to provide a sufficient safety margin, while not causing a significant number of unnecessary alerts. In a rail environment, the distance can be selected to be in a range between 0 and 6 inches (0 and 15 centimeters) above the top surface of the tracks 2. In a more particular embodiment, the plane 50 is located approximately 2 inches (5 centimeters) above the top surface of the tracks 2. However, it is understood that this range is only illustrative, and embodiments can include a plane that is located outside of such a range, including below the top surface of the tracks 2, but above the top surface of the ties 4.

It is understood that a plane 50 located below the vehicle is only illustrative. For example, a plane can be located above a vehicle, e.g., at a maximum allowable height for an underpass, for a parking garage, and/or the like. In this case, only an antenna of the vehicle may be permitted to extend through the plane. Similarly, a plane can be located perpendicular to the path 1, e.g., vertical and substantially parallel with a left or right lateral side of the vehicle. Such a plane can be used to detect elements that extend too far beyond a side of the vehicle, thereby posing a risk to people, structures, and/or the like, located near the path 1. In an embodiment, the plane is configured to be located approximately 12 to 24 inches (30 to 61 centimeters) from the lateral side of the vehicle. However, it is understood that this range of distances is only illustrative, and a distance can be closer to or further from the lateral side of the vehicle.

An embodiment of the vehicle evaluation system 10 is configured to detect any elements of the vehicle 8 that extend through the plane 50, classify each element that extends through the plane 50, and generate an alert if an element improperly extends through the plane 50. For example, as illustrated most clearly in FIG. 3B, for a plane 50 located below the vehicle 8, illustrative elements comprise the wheels 8A and the brake hose 8D, which is shown including a portion 52 that extends through and hangs below the plane 50.

However, it is understood that the wheels 8A and the brake hose 8D are only illustrative of various elements of a vehicle, which can be detected and classified by the vehicle evaluation system 10. Other elements include other types of hoses, cables, safety chains, etc., which can be located on a vehicle, an element that should be supported but has come loose (e.g., a muffler, a ladder, and/or the like), etc. Additionally, an element of the vehicle can include one or more removable items or temporarily located items, such as a portion of cargo being carried by the vehicle, a fastener for cargo (e.g., a strap, a chain, etc.), and/or the like. Similarly, for a plane located above a vehicle 8, the element can comprise a hood or roof of the vehicle 8, cargo sticking too far up from the vehicle 8, etc. For vertical planes located on the right or left of the vehicle 8, a mirror, an open door, a ladder, debris or cargo, and/or the like, may extend beyond an acceptable distance from the path 1. In an embodiment, the vehicle evaluation system 10 can generate an alert even if the element only temporarily extends through the corresponding plane, e.g., as a result of blowing in the wind caused by movement of the vehicle.

Figure 4:
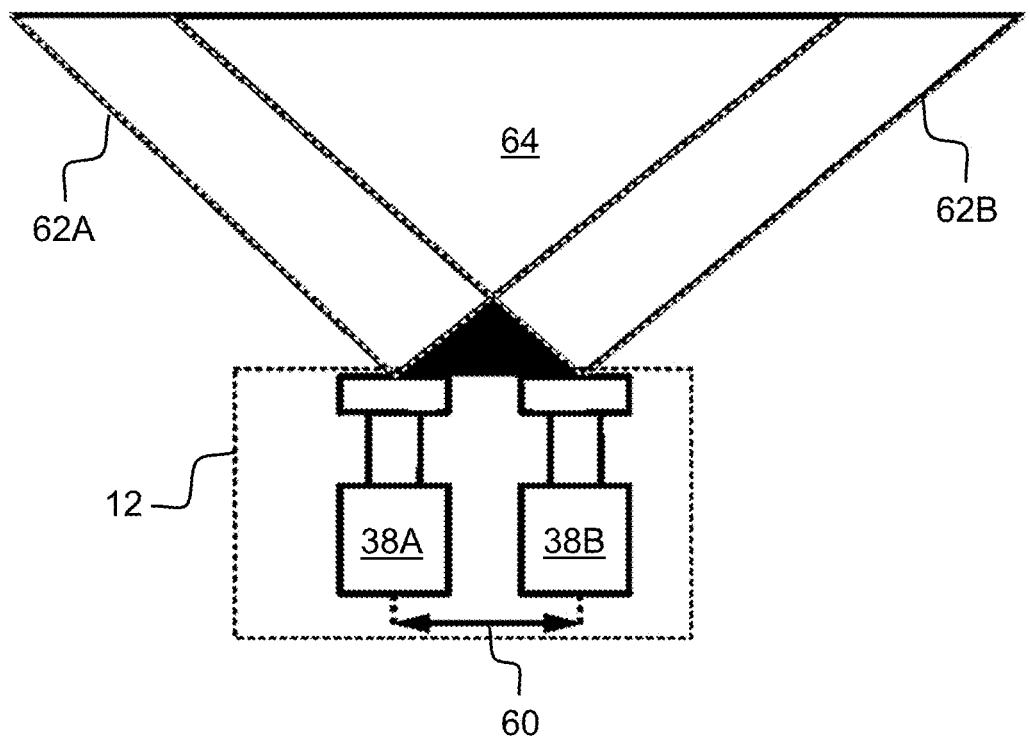
FIG. 4 illustrates some relevant concepts of stereo imaging to embodiments of the invention.

In a more particular embodiment of the imaging component 12 shown in FIG. 2, the imaging housing 36 can include two imaging devices 38, each of which can be an existing low-cost stereo imaging camera. FIG. 4 illustrates some relevant concepts of stereo imaging to embodiments of the invention. A stereo camera component 12 includes two cameras, shown as a left camera 38A and right camera 38B. These cameras 38A, 38B are mounted with their optical axes substantially parallel and a fixed distance 60 apart (e.g., as measured center-to-center), which is referred to as the stereo base. The stereo base distance 60 determines the best working distance for the pair of imaging devices 38A, 38B. In general, a larger stereo base distance 60 increases the effective stereo working distance.

Each imaging device 38A, 38B has its own overall field of view. For example, the field of view for the imaging device 38A can correspond to the triangular area 62A, while the field of view of the imaging device 38B can correspond to the triangular area 62B. A stereo region 64, in which measurement can be effectively performed, is defined by the overlap of the fields of view 62A, 62B. As illustrated, each imaging device 38A, 38B acquires image data in an area not imaged by the other imaging device 38A, 38B. Additionally, there is a small region between the imaging devices 38A, 38B in which no image data is acquired. For purposes of image processing using stereo image data, the stereo region 64 can be considered the effective field of view of the imaging component 12.

In general, acquiring image data of an underside of a vehicle 8 for analysis as described herein has two important considerations. First, an entirety of the undercarriage of the vehicle 8 should be imaged within the effective field of view of the imaging component 12 (i.e., the stereo region 64 for stereo imaging). Second, the image data should include sufficient clarity to allow clear detection of any hanging or dragging element above a certain size (for example, ¼ inch or ⅔ centimeter). The first consideration places a strict demand on the minimum span of the field of view at the working distance, and the second consideration places a similarly strict demand on either or both of the maximum speed of the vehicle 8 or the shutter or scanning speed of the imaging component 12. At a given shutter/scanning speed, faster movement of the vehicle 8 translates to more blur.

However, for a given field of view of an imaging component 12, a vehicle 8 located at a greater distance moving at a given speed will be less blurred than a vehicle 8 that is closer, and more of the vehicle will be visible at a greater distance. However, at greater distances, an ability to resolve smaller objects in the image data is drastically reduced.

In view of these considerations, imaging a moving vehicle 8 from directly below (e.g., normal to the ballast/roadbed) may not provide a sufficiently good option for some environments in which the vehicle evaluation system 10 is deployed. In particular, for evaluating rail vehicles 8, given the position of the imaging component 12 is fixed, at most, at or slightly below the level of the ballast 6, a distance to the moving rail vehicle 8 is minimized, which minimizes the field of view and maximizes the speed blurring effect. However, an advantage of such close imaging is resolution. In particular, the resolution of the entire imaging component 12 would be devoted to a small portion of the underside of the vehicle 8 and that portion, if unblurred by speed, will be able to be analyzed in great detail by the analysis component 14. As a result, for some implementations of the vehicle evaluation system 10, even imaging from directly below the vehicle 8 may be suitable.

In view of these considerations, FIGS. 3A and 3B illustrate a shallow angle imaging view looking down the path (e.g., between the tracks 2). Acquiring image data while looking straight down the path 1 can increase a field of view and reduce blur. Furthermore, the field of view is more focused between the tracks 2 rather than on the passing vehicle 8. However, as only the more distant portions of the vehicle 8 are imaged as they approach, effective resolution is reduced. There is therefore an ideal angle for the imaging component 12 to acquire image data, at which the field of view covers the full underside of the target vehicle 8, speed effects are reduced, and resolution remains acceptable for the desired analysis described herein (e.g., detecting hanging or dragging elements of the vehicle 8).

Figure 5:
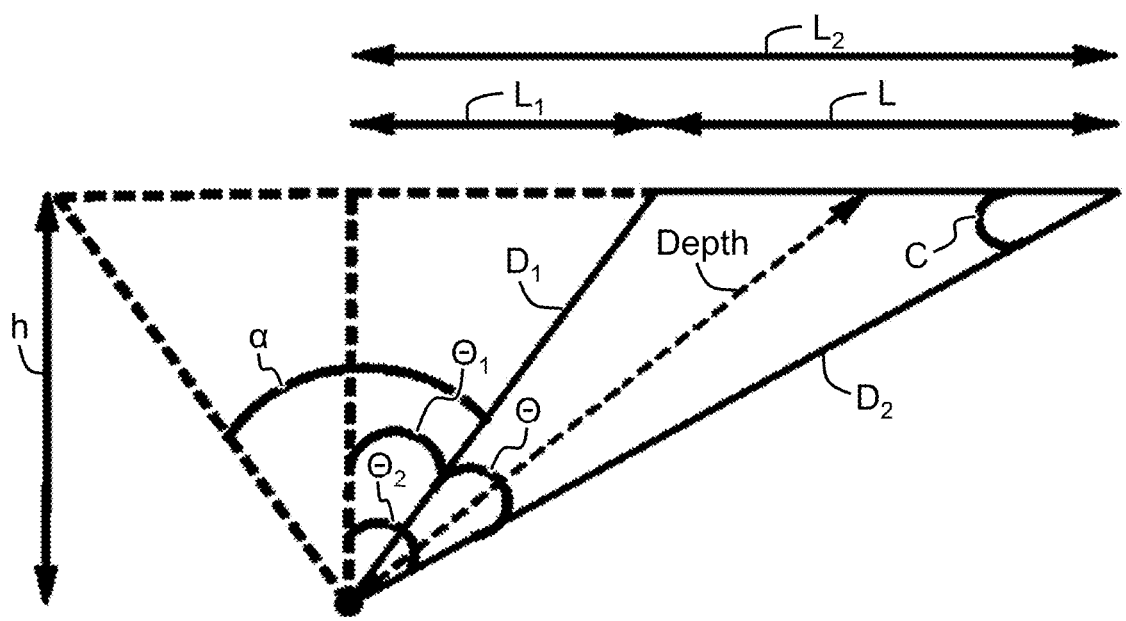
FIG. 5 shows a diagram for calculating an optimal viewing angle according to an embodiment.

FIG. 5 shows a diagram for calculating an optimal viewing angle according to an embodiment. In the drawing:

| Parameter | Description |
| --- | --- |
| α | Camera pitch angle (>θ/2) |
| h | Vertical distance from camera to dragging equipment detector (DED) height limit |
| $\theta_1$ | Angle between upper extreme of vertical field of view (VFOV) and vertical line |
| $\theta_2$ | Angle between lower extreme of VFOV and vertical line |
| θ | Camera's VFOV |
| $D_1$ | Distance to upper extreme of VFOV at heigh h |
| $D_2$ | Distance to lower extreme of VFOV at heigh h |
| Depth | Min distance between camera and object such that camera VFOV criteria is satisfied |
| C | Angle used to calculate Depth |
| $L_1$ | Distance between upper extreme of VFOV and vertical line at heigh h |
| $L_2$ | Distance between lower extreme of VFOV and vertical line at heigh h |
| L | Distance covered by the camera's VFOV at height h |

Using some or all of the above parameters, a range of possible viewing angles (e.g., camera pitch angles) can be calculated using any solution. From the range of possible viewing angles, an optimal pitch angle can be selected, for example, as the middle angle in the range of possible angles. Such a calculation is subject to various constraints in the configuration, including, but not limited to, the camera field of view, camera capture rate, camera range, camera resolution, a minimum detectable target size, a speed of the vehicle, a height threshold for detecting targets, and/or the like.

Returning to FIG. 4, when utilized, a stereo imaging system must first be co-registered, e.g., calibrated in such a fashion that it can be determined at what distance any target imaged by both imaging devices 38A, 38B is located, based on the parallax in the image data acquired by both imaging devices 38A, 38B. The parallax—the difference between the apparent location of the target in the image acquired by one imaging device 38A and the apparent location of the target in the image data acquired by the other imaging device 38B— decreases with distance, and is also dependent on the separation 60 of the two imaging devices 38A, 38B.

As the analysis described herein requires an ability to sufficiently accurately localize elements of the target, and as there is an obvious limit on the maximum separation 60 for any system placed between the tracks 2 of a standard railroad, these factors allow a calculation of the optimum combination of camera separation 60, distance Depth, and angle α. With the appropriate selection of angles, and reasonably high-speed cameras/imaging devices, an embodiment of the vehicle evaluation system 10 described herein can distinguish hanging or dragging elements of any size down to approximately ¼ inch or ⅔ centimeter at vehicle 8 speeds of up to one hundred fifty miles per hour (two hundred forty kilometers per hour). Faster imaging systems with the same resolution can permit suitable imaging of vehicles 8 operating at even higher speeds.

As used herein, a reasonably high-speed camera/imaging device has a frame rate fast enough to capture the required image data before all objects within the captured image data have moved out of the field of view (i.e. due to vehicle motion). To this extent, the imaging device can have a sufficiently high frame rate such that there are no gaps in the imaged object. In an illustrative example, image resolution can be sufficiently high so that the most distant objects required to be captured in the image data can resolved down to ¼ inch (e.g., 6 millimeters).

In a more particular embodiment, the system is configured to accommodate vehicles traveling at up to 150 miles per hour (e.g., 240 kilometers per hour), with a back-to-back distance between wheels on the same axle of 60 inches (e.g., 152 centimeters). Furthermore, the system is configured to detect a minimum detectable element size of ¼ inch (e.g., 6 millimeters) with a minimum allowed vertical distance between the imaging device and hanging equipment of 8 inches (20 centimeters). Using an imaging system with a frame rate of 60 frames per second, an imaging device field of view of 45 degrees by 45 degrees, an image resolution of 640 by 480 pixels, and an imaging range of 12 inches-600 inches (e.g., 30 centimeters to 1525 centimeters), an optimal pitch angle α for the imaging system can be approximately 64 degrees The proper registration and calibration of the image component 12 provides an ability to define the height limit plane 50 shown in FIGS. 3A and 3B. This, along with programmed knowledge of the basic design of the target vehicles 8, allows the vehicle evaluation system 10 to detect hanging or dragging elements 52 that extend through the plane 50, and also can allow for identification of such elements 52.

Figure 6A:
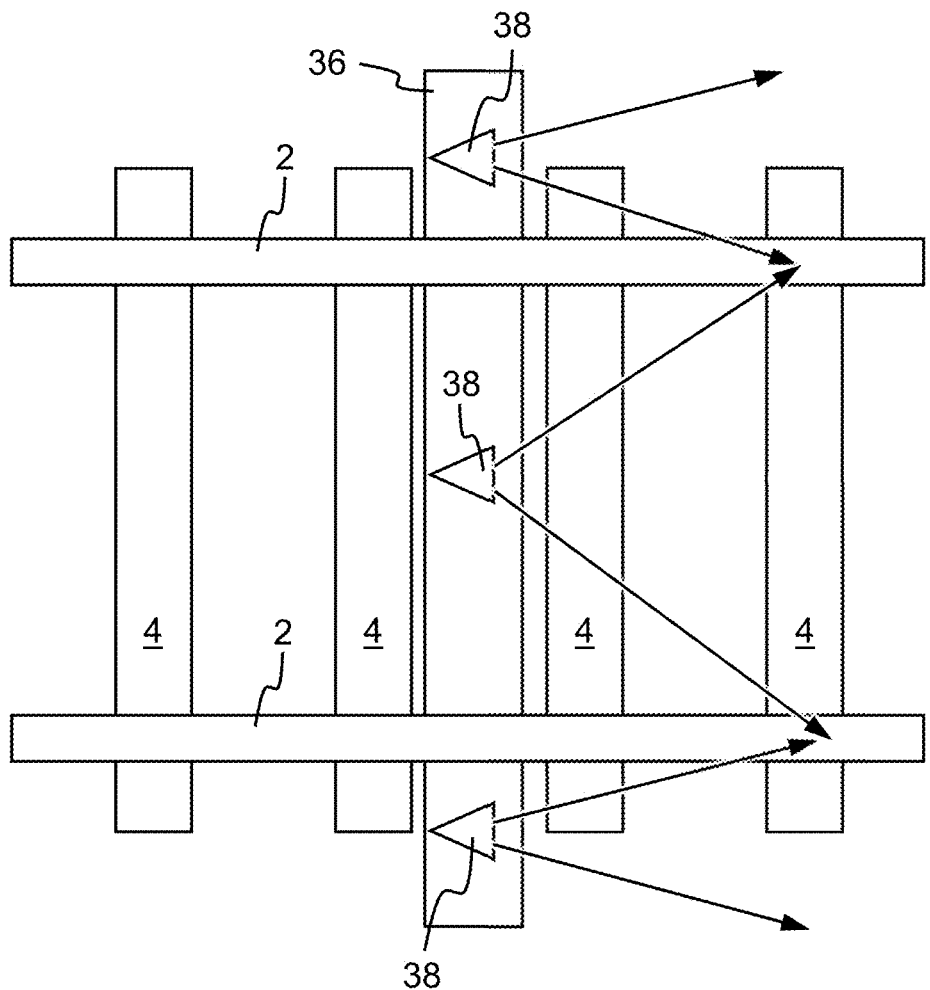
FIGS. 6A and 6B show top and side views, respectively, of an illustrative imaging configuration for acquiring image data of a passing rail vehicle according to an embodiment.
Figure 6B:
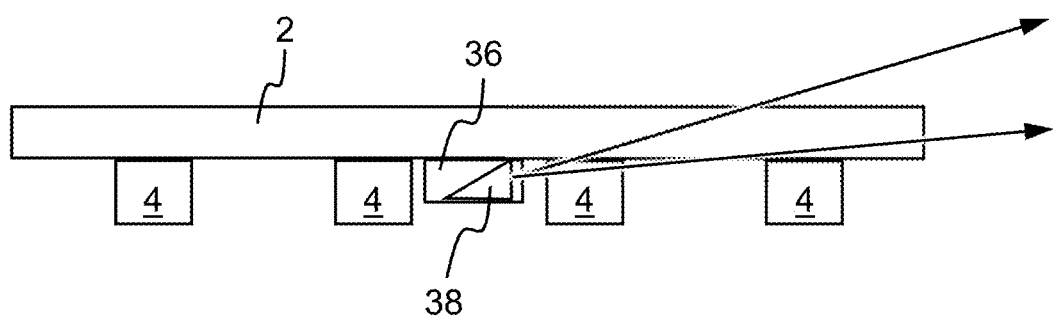

FIGS. 6A and 6B show top and side views, respectively, of an illustrative imaging configuration for acquiring image data of a passing rail vehicle according to an embodiment. In this case, a single housing 36 can be located between two ties 4 and secured in a manner that provides the imaging devices 38 a stable location from which to acquire image data of rail vehicles traveling along the tracks 2. For example, the housing 36 can be mounted to the tracks 2, the ties 4, and/or embedded in the ballast, in a manner that isolates that imaging devices 38 from the vibrations of the passing rail vehicles.

In this embodiment, the housing 36 includes three imaging devices 38, two of which are located on the field side of the tracks 2, and one of which is centrally located on the interior of the tracks 2. As shown in FIG. 6B, each imaging device 38 can be located at a height that is no higher than the height of the ties 4. In an embodiment, each imaging device 38 can be configured to acquire three-dimensional image data. For example, each imaging device 38 can comprise a scanning LiDAR, flash LiDAR, and/or the like, imaging device. Similarly, an embodiment of an imaging device 38 can use structured light imaging, time of flight (TOF) imaging, gray-code light projection based imaging, ultrasound, and/or the like, to acquire the image data. In this case, each imaging device 38 can include and/or can be operated in conjunction with an illumination device 39 (FIG. 2). Such an illumination device 39 can use any solution for illuminating the imaging area, including emitting any type of electromagnetic radiation, such as light in any spectra, ultrasonic radiation, microwave radiation, X-ray radiation, etc., emitting mechanical waves, such as ultrasound, and/or the like.

Figure 7:
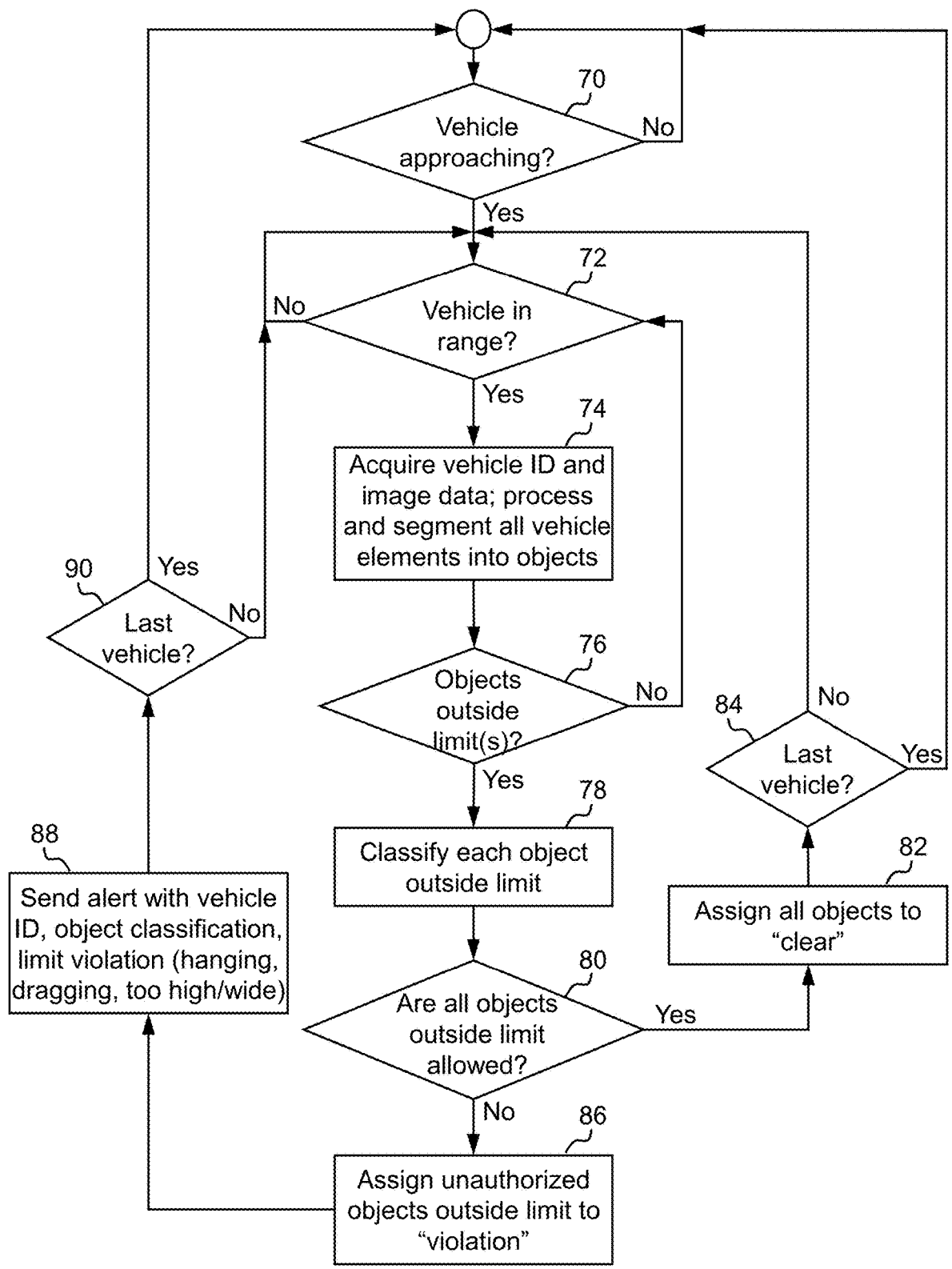
FIG. 7 shows an illustrative process for evaluating vehicles according to an embodiment.

FIG. 7 shows an illustrative process for evaluating vehicles, which can be implemented by the vehicle evaluation systems 10 of FIGS. 1 and 2, according to an embodiment. Referring to FIGS. 1 and 7, in action 70, the analysis component 14 waits until an approaching vehicle is detected, e.g., by a detection component 16. When no vehicle is detected, the analysis component 14 continues to monitor the path 1 until a vehicle is detected.

Once an approaching vehicle is detected, in action 72, the action component 32D can wait for the approaching vehicle to enter an analysis range and, if necessary, initialize the imaging components 12 and/or identification component 18 to acquire data, e.g., by instructing the components to change from a sleep mode to an active mode. A determination that the vehicle is within the analysis range can be done using any solution. For example, the vehicle evaluation system 10 can include a second detection component 16 placed just as the vehicle is entering the analysis range, which sends a signal indicating the presence of the vehicle. Similarly, the identification component 18 can be placed at a location at which the vehicle identification is acquired just as the vehicle is entering the analysis range. Still further, the analysis component 14 can evaluate image data acquired by one or more of the imaging components 12 to determine a location of the vehicle.

Regardless, once a vehicle is within the analysis range, in action 74, the identification component 18 can acquire vehicle identification data (if not done previously) and the corresponding imaging component(s) 12 can acquire image data of the vehicle as it passes through the analysis range. The image data can be processed by the segmentation component 32A to segment vehicle elements visible in the image data at various locations on the vehicle into individual objects (blobs) with the corresponding location of each object in three-dimensional space.

The location can be identified and stored using any solution. For example, the location information can include one or more of the outer extents (e.g., lower, upper, right, left) of the object visible in the image data. When image data for multiple images is analyzed, the outer extent can be defined as the most extreme location (e.g., the lowest extent) found for the object and/or a range of the outer extents found in each of the images. The number of outer extents determined and stored can depend on the number of planes with which the element is being evaluated. For example, when only a lower limit is being evaluated, the location information can include only the lowest extent of the object.

In action 76, the classification component 32B can determine whether any elements of the vehicle are at least partially located outside of the limit (e.g., extend through the defined plane 50 shown in FIGS. 3A and 3B). If there are no such objects, the process can return to process another vehicle. Otherwise, in action 78, the classification component 32B can classify each object that is at least partially located outside of the limit into one of a plurality of categories. The classification component 32B can use any of various classification solutions to classify each object. Illustrative classifiers include a histogram of oriented gradients (HOG) classifier, an artificial intelligence system, an expert system, a trained neural network (e.g., a deep learning system), and/or the like.

The categories can correspond to various types of elements commonly found on the corresponding vehicles. For example, illustrative categories can include wheel, axle, hose, cable, etc. Additionally, for elements that may not be predictable or easily classified, such as an object being transported by the vehicle which may have come lose or fallen, the categories can include an undetermined category. In general, the classification component 32B should be able to distinguish objects that correspond to elements that are allowed to extend beyond a limit, such as wheels, an antenna, etc., from other elements that may improperly extend beyond the limit. Further classification of any unauthorized elements can be useful in order to provide additional information, e.g., for use by the action component 32D and/or the user system 40, regarding the nature of the dragging or hanging object and the threat the it may pose.

To this extent, in action 80, the examination component 32C can examine each of the classified objects and determine whether the object is allowed to be outside of the limit. For example, when evaluating a vehicle for low hanging or dragging equipment, the examination component 32C can determine whether each object is a wheel, the only elements of the vehicle that are expected to be at such a height. For each object allowed to be outside of the limit, the examination component 32C can mark the object as clear (safe).

In addition to evaluating objects according to the classification, the examination component 32C can be configured to further analyze each authorized object to determine whether it is operating safely and/or in a safe operating condition before marking the object as clear. For example, the examination component 32C may be able to analyze image data of a wheel to determine whether the wheel is flat/has a flat spot, has a shredded or insufficient tread, is misaligned, and/or the like, e.g., based on a height of the wheel or a portion of the rim or tread visible in the image data for the wheel. Similarly, if an object is in a location corresponding to a wheel, but is not classified as a wheel, such an error may be indicative of a broken wheel.

When all of the objects outside of the limit are allowed, in action 82, the examination component 32C can assign a clear status to the objects. In action 84, the process can return to either process image data for another vehicle (e.g., another rail vehicle in a train) or wait for another vehicle to approach.

Otherwise, in action 86, the examination component 32C can assign a violation (unsafe) status to each unauthorized object at least partially located outside the limit. In action 88, the action component 32D can perform one or more actions based on the violation. For example, the action component 32D can send an alert for processing by the user system 40. The alert can include various information on the corresponding violation, e.g., the vehicle identification, the object classification, the limit violation, and/or the like. The limit violation can include an extent to which the limit was violated, e.g., whether the object was hanging in the air, dragging on the ground, and/or the like. Subsequently, in action 90, the process can return to either process image data for another vehicle (e.g., another rail vehicle in a train) or wait for another vehicle to approach.

In an embodiment, one or more aspects of the operation of the analysis component 14 can be periodically retrained and updated based on image data acquired by the vehicle evaluation system 10 and/or other similarly deployed vehicle evaluation systems 10 using any solution. For example, the analysis component 14 can store some or all of the image data, which can be provided to a user system 40 to retrain, for example, the classification component 32B and/or the examination component 32C, using machine learning (e.g., deep learning). Such retraining can include a human expert providing analysis of, for example, image data for which an object was misclassified, and subsequent retraining and retesting of the model before deployment of the updated model.

In addition to detecting elements of a vehicle that are improperly present in a restricted region, an embodiment of the analysis component 14 can be configured to detect and initiate action on one or more potentially unsafe or changed conditions of the vehicle. For example, an embodiment of the examination component 32C can learn (e.g., using deep learning) and retain the shapes and locations of the visible elements of a vehicle and/or type of vehicle in its normal operating state. In a more particular example, the vehicle evaluation system 10 can be deployed to a location which has recurring, repeat passing vehicles, e.g., as part of a fleet of rail vehicles (e.g., high speed trains, unit trains, transit consists, etc.), a fleet of road vehicles (e.g., trucks entering and exiting a warehouse area, buses entering and leaving a garage, rental vehicles entering and leaving a lot, etc.), owner vehicles entering and leaving a parking garage of a residential complex, and/or the like. In this case, the examination component 32C can use vehicle identification information as well as the learned elements, which can be particular to the vehicle and/or a class of vehicles, to detect when one or more elements are missing, newly added, changed in some manner (e.g., due to an accident or wear), and/or the like, which can generate an alert for a potential unsafe condition (e.g., broken or missing equipment, possible placement of contraband, tracking device, explosives, etc.) or a potential change in condition (e.g., after market equipment, damaged equipment, etc.).

While shown and described herein as a method and system for evaluating vehicles, it is understood that aspects of the invention further provide various alternative embodiments. For example, in one embodiment, the invention provides a computer program fixed in at least one computer-readable medium, which when executed, enables a computer system including at least one computing unit to evaluate vehicles using a process described herein. To this extent, the computer-readable medium includes program code, such as the analysis program 30 (FIG. 2), which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; and/or the like.

As used herein, unless otherwise noted, the term "set" means one or more (i.e., at least one) and the phrase "any solution" means any now known or later developed solution. The singular forms "a," "an," and "the" include the plural forms as well, unless the context clearly indicates otherwise. Additionally, the terms "comprises," "includes," "has," and related forms of each, when used in this specification, specify the presence of stated features, but do not preclude the presence or addition of one or more other features and/or groups thereof.

The enumeration of the various embodiments herein should not be taken to be a complete or exclusive list. All other reasonable embodiments or derivations of the invention are subsumed within this description. The foregoing description of various embodiments of this invention has been presented for purposes of illustration and description. It is not intended to be exhaustive or to limit the invention to the precise form disclosed and inherently many more modifications and variations are possible. All such modifications and variations that may be apparent to persons skilled in the art that are exposed to the concepts described herein or in the actual work product, are intended to be included within the scope of this invention disclosure.

What is claimed is:

1. A vehicle evaluation system comprising:
   a set of imaging devices configured to acquire image data relating to a passing vehicle, wherein the image data includes image data for an area including an authorized region in which the passing vehicle is present and a restricted region within which no element or portion of an element of the passing vehicle should be unnecessarily located; and
   a computing unit for processing the image data to detect any element of the passing vehicle unnecessarily located within the restricted region, wherein the processing includes:
      processing the image data to identify whether any elements of the passing vehicle are at least partially located within the restricted region;
      classifying each element at least partially located within the restricted region into one of a plurality of categories of elements; and
      initiating an action in response to at least one element at least partially located within the restricted region not being classified into a category of elements that is necessary to be located within the restricted region.

2. The system of claim 1, wherein the restricted region is located below the vehicle, and wherein only elements classified as wheels of the passing vehicle are necessary to be located within the restricted region.

3. The system of claim 1, wherein the set of imaging devices includes at least one imaging device located such that the passing vehicle travels directly thereover.

4. The system of claim 3, wherein the at least one imaging device is located between tracks on which the passing vehicle is traveling and is located at or below a height of the tracks.

5. The system of claim 1, wherein the set of imaging devices includes at least one imaging device located on each side of a path of the passing vehicle.

6. The system of claim 5, wherein the computing unit processes image data acquired by an imaging device located on a side of the path of the passing vehicle to detect any element of a passing vehicle unnecessarily located within a restricted region located along a lateral side of the vehicle.

7. The system of claim 1, wherein at least one of the set of imaging devices is a light detection and ranging (LiDAR) imaging device.

8. The system of claim 1, wherein the set of imaging devices includes at least one pair of imaging devices that acquire stereo image data for the area.

9. The system of claim 1, wherein at least one of the set of imaging devices is a three-dimensional laser scanner.

10. The system of claim 1, wherein the computing unit classifies each element at least partially located within the restricted region using at least one of: a deep learning system, an artificial intelligence system, or an expert system.

11. The system of claim 1, wherein the passing vehicles include a plurality of connected rail vehicles traveling along tracks.

12. A method of evaluating a vehicle, the method comprising:
   acquiring image data relating to a passing vehicle using a set of imaging devices, wherein the image data includes image data for an area including an authorized region in which the passing vehicle is present and a restricted region within which no element or portion of an element of the passing vehicle should be unnecessarily located;
   a computing unit processing the image data to detect any element of the passing vehicle unnecessarily located within the restricted region, wherein the processing includes:
      the computing unit processing the image data to identify whether any elements of the passing vehicle are at least partially located within the restricted region;
      the computing unit classifying each element at least partially located within the restricted region into one of a plurality of categories of elements; and
      the computing unit initiating an action in response to at least one element at least partially located within the restricted region not being classified into a category of elements that is necessary to be located within the restricted region.

13. The method of claim 12, wherein the restricted region is located below the vehicle, and wherein only elements classified as wheels of the passing vehicle are necessary to be located within the restricted region.

14. The method of claim 12, wherein the computing unit processes image data acquired by an imaging device located on a side of the path of the passing vehicle to detect any element of a passing vehicle unnecessarily located within a restricted region located along a lateral side of the vehicle.

15. The method of claim 12, wherein at least one of the set of imaging devices is a light detection and ranging (LiDAR) imaging device.

16. The method of claim 12, wherein the set of imaging devices includes at least one pair of imaging devices that acquire stereo image data for the area.

17. The method of claim 12, wherein the computing unit classifies each element at least partially located within the restricted region using at least one of: a deep learning system, an artificial intelligence system, or an expert system.

18. A rail vehicle evaluation system comprising:
a set of imaging devices configured to acquire image data relating to a passing rail vehicle, wherein the image data includes image data for an area of an underside of the passing rail vehicle, the area including an authorized region in which the passing rail vehicle is present and a restricted region within which no element or portion of an element of the passing rail vehicle should be unnecessarily located; and
a computing unit for processing the image data to detect any element of the passing rail vehicle unnecessarily located within the restricted region, wherein the processing includes:
processing the image data to identify whether any elements of the passing rail vehicle are at least partially located within the restricted region;
classifying each element at least partially located within the restricted region into one of a plurality of categories of elements, wherein the plurality of categories of elements include wheels; and
initiating an action in response to at least one element at least partially located within the restricted region not being classified as a wheel.

19. The rail vehicle evaluation system of claim 18, wherein at least one imaging device of the set of imaging devices is located between tracks on which the passing rail vehicle is traveling and is located at or below a height of the tracks.

20. The rail vehicle evaluation system of claim 19, wherein the at least one imaging device is configured to acquire the image data using a shallow angle imaging view looking between the tracks.

* * * * *